United States Patent
Gleman et al.

(10) Patent No.: US 6,829,944 B1
(45) Date of Patent: Dec. 14, 2004

(54) BOLT TENSION GAUGING SYSTEM

(76) Inventors: Stuart M. Gleman, 3561 Alan Dr., Titusville, FL (US) 32780; Geoffrey Keith Rowe, 1022 Antelope Trail, Winter Springs, FL (US) 32708

( * ) Notice: Subject to any disclaimer, the term of this patent is extended or adjusted under 35 U.S.C. 154(b) by 0 days.

(21) Appl. No.: 10/266,894

(22) Filed: Oct. 8, 2002

Related U.S. Application Data

(60) Provisional application No. 60/327,774, filed on Oct. 9, 2001.

(51) Int. Cl.[7] ............................................. F16B 31/02
(52) U.S. Cl. ........................................................ 73/761
(58) Field of Search ...................... 73/760–761; 356/32, 356/34

(56) References Cited

U.S. PATENT DOCUMENTS

| | | | | |
|---|---|---|---|---|
| 3,354,702 A | * | 11/1967 | Eisner ............................. | 356/32 |
| 3,462,223 A | * | 8/1969 | Tiemann et al. ................ | 356/32 |
| 3,561,260 A | * | 2/1971 | Reynolds ........................ | 73/761 |
| 3,718,066 A | * | 2/1973 | Dally .............................. | 356/34 |
| 3,788,186 A | * | 1/1974 | Crites ............................. | 411/8 |
| 3,823,639 A | * | 7/1974 | Liber .............................. | 73/761 |
| 3,886,840 A | * | 6/1975 | Bossler .......................... | 73/761 |
| 3,943,819 A | * | 3/1976 | Charron ......................... | 73/761 |
| 4,428,240 A | * | 1/1984 | Schoeps ......................... | 73/761 |
| 5,437,525 A | * | 8/1995 | Bras .............................. | 73/761 |
| 5,970,798 A | * | 10/1999 | Gleman et al. ................. | 73/761 |
| 6,009,759 A | * | 1/2000 | Kibblewhite et al. ........... | 73/761 |

* cited by examiner

*Primary Examiner*—Edward Lefkowitz
*Assistant Examiner*—Takisha Miller
(74) *Attorney, Agent, or Firm*—Daniel S. Polley, P.A.

(57) ABSTRACT

An apparatus and method for measuring the tension in bolts, screws, rivets, and other fasteners, is disclosed wherein the deformation of the fastener head is measured, (or the end of fastener in such cases as there is not a distinct formed head, for example stud bolts). The deformation generally is an analytic function of the tension in the fastener. The deformation is a continuous two-dimensional distribution over the surface of the fastener head, which allows redundant measurement and therefore more reliable measurement of fastener total axial tension, and also allows in some instances an evaluation of the bending stresses in the fastener from the distortion of the deformation pattern on the head. An advantage of the invention is that the length of the fastener or its temperature need not be known. The measurements can be determined by optical, capacitance, optical imaging, air gauging and piezoresistive techniques.

36 Claims, 3 Drawing Sheets

BOLT TENSION GAUGING SYSTEM

This application claims the benefit of and priority to U.S. Application No. 60/327,774, filed Oct. 9, 2001, which is incorporated by reference.

FIELD OF THE INVENTION

The invention relates generally to determining tension in bolts, and particularly, to a bolt tension gauging system, based on deformations in the head of the bolt.

BACKGROUND OF THE INVENTION

Fasteners are used to hold the plates of a joint together. By "fastener" we include as examples (but do not limit ourselves to), bolts, stud bolts, rods, rivets, etc. In addition to these fasteners, the present invention also applies to such devices as mine ceiling bolts and truss rods.

The axial tension force in the fastener clamps the plates together, or in the case of truss rods, holds nodes of a structure in some constant relation to one another. The problems in providing a known preload tension in a bolted joint are well known. For example a torque wrench used to tension a bolt even in best case provides only a plus or minus 25 percent error in tension, because of the unknown frictional work in torquing the bolt. Bolt elongation methods which consider the bolt as a very massive stiff spring and relate the tension to the measured bolt elongation via Hooke's Law have been used for many decades. The ultrasonic bolt gauge has been around for about 35 years now, and is one of the primary methods of verifying tension in critical bolts. In ultrasonic determination of bolt load, the increased time of flight of an ultrasonic pulse is used to measure increased tension (and therefore elongation and decreased sonic speed) in the fastener.

In any analysis of bolt tension by elongation, it is necessary to know the bolt grip length, and in particular for the ultrasonic methods, the bolt temperature must be known accurately for good tension measurements to be obtained. The impetus to the present invention was the inconvenience in correcting tension loads obtained ultrasonically for temperature and grip length.

Other tensioning techniques such as hydraulic tensioners and bolt heaters are also prone to large errors and require independent verification of preload tension. Other techniques of actual tension verification such as strain gauges are inconvenient and fragile and also prone to performance reliability problems in the sense that a damaged strain gauge will give a wrong reading but not give any indication or signature that the reading is wrong. The present invention actually records a signature pattern for future reference, so that any damage to the bolt (which is itself the indicator of its, tension) will be immediately apparent to the operator of our invention.

SUMMARY OF THE INVENTION

A system and method is provided for measuring the preload tension or clamping force in bolts, rivets, and other fasteners; in which the tension is found from the deflection (depression) of the central portion of the fastener head as compared with its unloaded shape.

As the head of a bolt is deformed by the application of tension load to the bolt, the present invention measures this deformation by one of many methods such as Newton's Rings (optical interferometry) or speckle pattern interferometry or even by capacitor arrays or air gap gauge technique. A deflection for a particular bolt can be calculated and a Newton's Rings experiment then performed, to obtain good agreement between experimental and theoretical values.

The present invention can record a signature pattern for future reference, so that any damage to the bolt (which is itself the indicator of its tension) can be immediately apparent to the operator of the invention.

Thus, the present invention provides a method for measuring the dishing or deformation of a bolt head as a measure of its tension state.

DETAILED DESCRIPTION OF THE INVENTION

Figure 1:
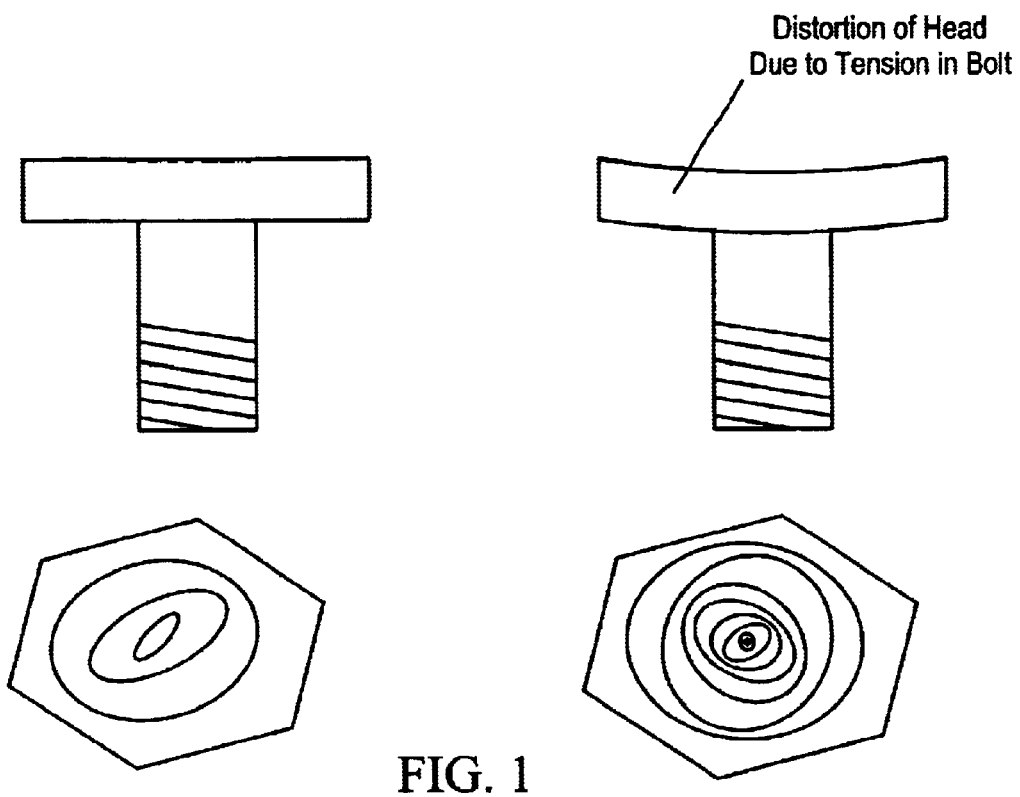
FIG. 1 illustrates various views of a headed fastener in a tensioned and untensioned state.

For the case of a standard bolt fastener, refer to FIG. 1. The untensioned fastener is shown in FIG. 1A, and its distortions due to tension are shown greatly exaggerated in FIG. 1B. The distortions in the head, which can be described as a depression of the center of the head in relation to its edges, can be measured by various techniques. Use of a mechanical depth gauge or sagitta gauge is possible, but in most instances the total depth will be on the order of a thousandth of an inch so that repeatable measurements of this nature with few percent accuracy in the real world may be difficult.

One preferred method for measuring the depression is Newton's Rings type optical interferometry. In this method an optically flat transparent plate is placed in contact with or carefully spaced quite close to the bolt head. It may be necessary to polish the head surface somewhat to make the fringes apparent (i.e. satin finish, etc.) The surface need not be optically flat to get good rings.

The interference pattern for the unstressed bolt can be recorded, for example by a video camera input to a computer or other conventional recording mechanisms, as can be the pattern for the stressed bolt. Comparison of the two patterns yields the overall depth of the depression simply by counting the rings in the interference pattern. If the images are recorded in the computer memory, any subsequent check of bolt tension will allow determination of tension loss or other damage to the bolt, since the shape and number of rings should not change as long as the bolt tension is constant. The ring interferograms are shown for unstressed and stressed bolt heads schematically in FIGS. 1C and 1D.

The invention will be primarily discussed with respect to headed bolts or headed fasteners. However, the invention is not limited to headed bolts/fasteners and can also be used within non headed bolts and fasteners (All of these headed and non-headed bolts and fasteners, for purposes of the specification and claims, will be collectively referred to as "Bolt" or "Fastener"). This definition shall also include fasteners such as, but not limited to, headed rivets, including countersunk aircraft rivets.

The length of the fastener does not affect the distortion of the head, but only the stress in the fastener at the location of the head. This is a particular advantage for such things a s very short aircraft rivets, where the length changes as the opposite end is set (upset, peened over).

Figure 2:
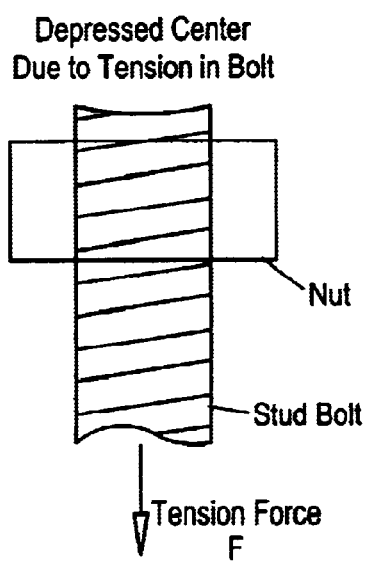
FIG. 2 illustrates a depressed center in a non-headed fastener.

For nonstandard fasteners such as truss rods or ceiling bolts or stud bolts, the same technique is used except that the end of the fastener is observed in the same fashion as the head of the bolt described above (see FIG. 2). Here the distortion will be less than that for a headed fastener, but there will be some distortion due to the local axial shear in the fastener at the location of the thread interface between the fastener and the nut. If a there is a large projection of the threaded end of the bolt past the nut, then the sensitivity of this method is correspondingly reduced. We note in passing that this method can be used on the end of a threaded fastener opposite the head, with similar losses in sensitivity.

Figure 3:
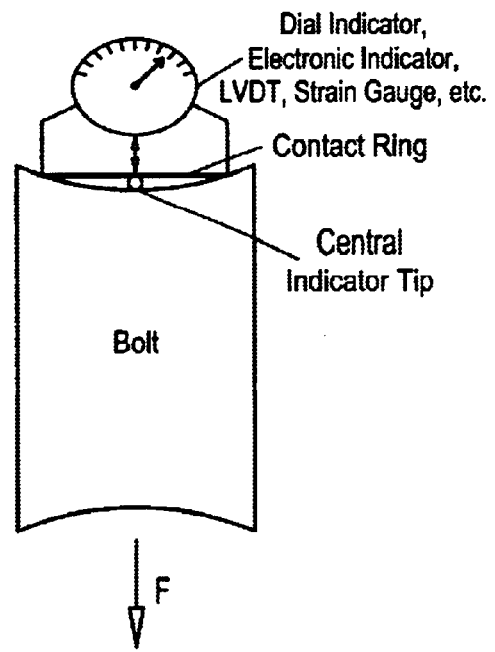
FIG. 3 illustrates a single-point tension indicator version of the present invention.
Figure 4:
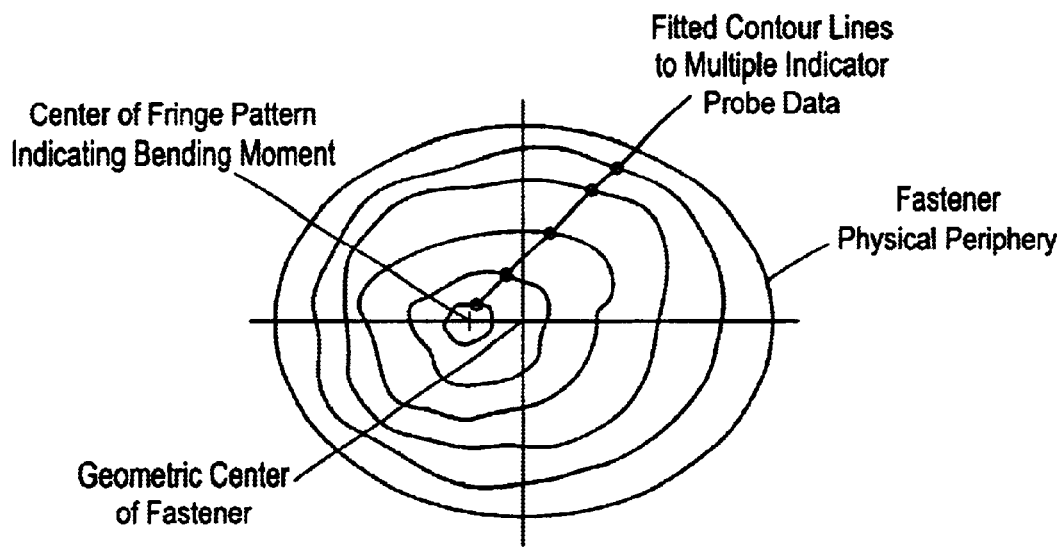
FIG. 4 illustrates a "contour map" in accordance with the present invention.

The depression of the center of the bolt can be measured also by means of electronic depth gauges based on LVDT or strain gauge or other piezoresistive techniques (see FIG. 3). The basic instrument would comprise a contact ring for the periphery of the bolt head with a central contact probe for the center of the head. The center probe would be connected to the LVDT or the piezoresistor element. The instrument would be used to record the unstressed bolts depth reading (positive negative or zero, and then the corresponding stressed reading. The tension would be functionally related to the difference in readings—in most instances simply proportional, but our invention includes nonlinear behavior also. In order to obtain more information on the bolt tension (for example bending or sideloading data) it is possible to use a similar instrument with a peripheral ring (this time with an orientation mark to be aligned with some known azimuthal marking of the bolt head) and a multiplicity of probes to permit a multidimensional "signature" of the bolt head to be obtained. A two-dimensional curve fit to these data point would allow the central depression (magnitude and location) of the head to be calculated. The location of the center relative to the true center of the bolt would permit estimation of the bending loads relative to the axial load of the bolt. (See FIG. 4)

Figure 5:
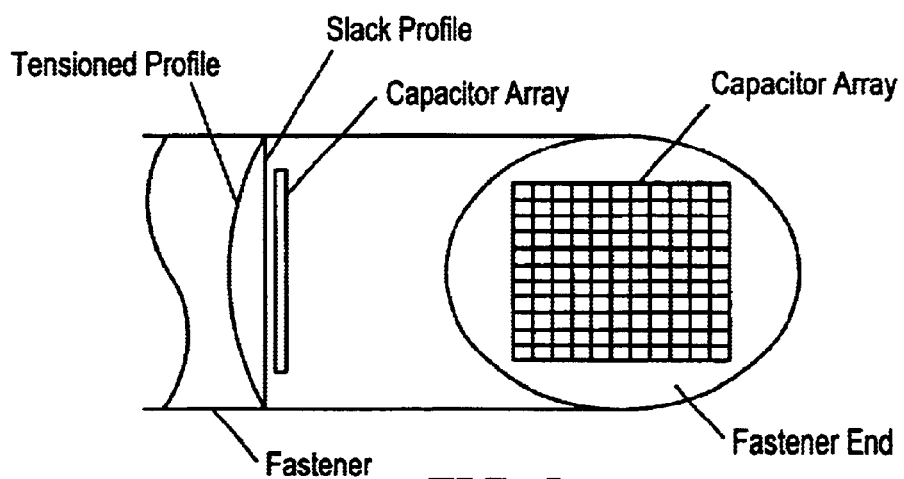
FIG. 5 illustrates a capacitor array version of the present invention.

It is also possible to use a central capacitive probe or an array of capacitive probes (including a planar array of capacitor elements) to locate and evaluate the depth of the central depression of the head of a loaded bolt or other fastener. (See FIG. 5)

Figure 6:
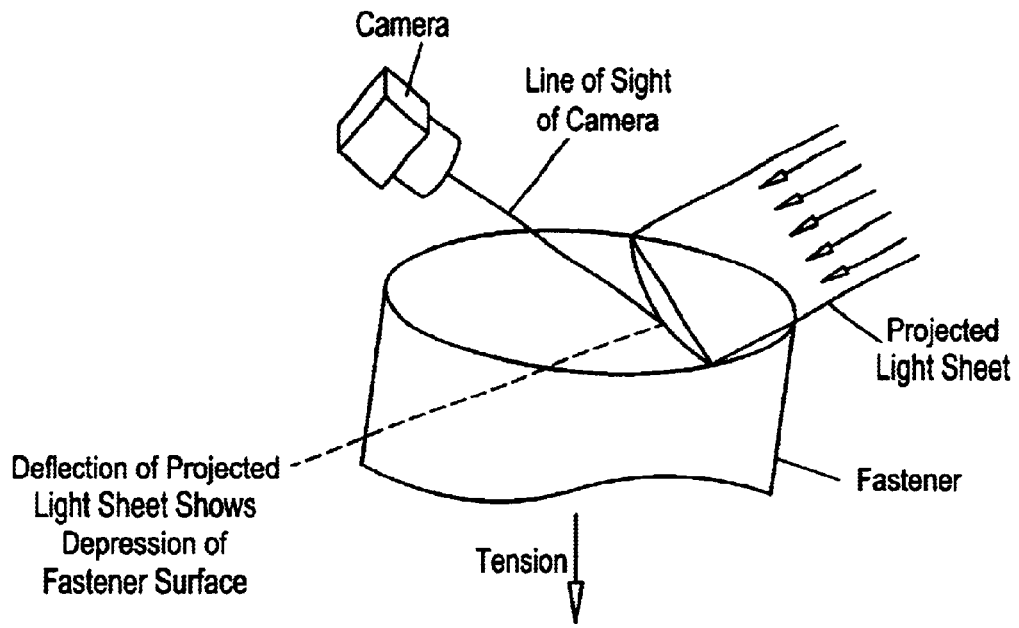
FIG. 6 illustrates a projected structured light microscope version of the present invention.

It is also possible to use structured light to evaluate the magnitude and location of the central depression of a tensioned bolt. (See FIG. 6)

Figure 7:
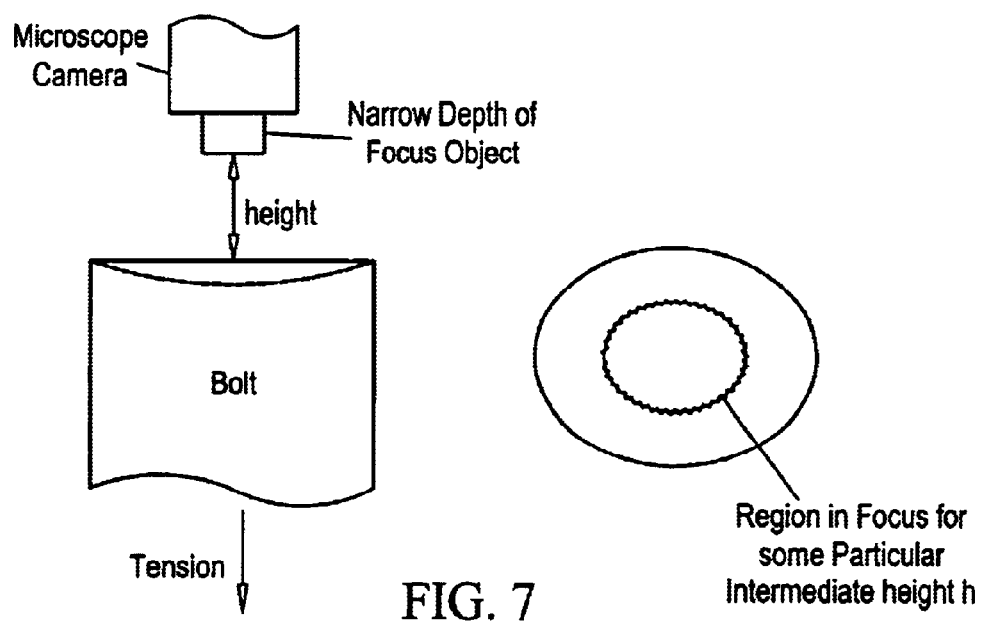
FIG. 7 illustrates a refocus microscope depression measurement version of the present invention.

It is also possible to use a refocusing microscope to evaluate the depth and location of the central depression of a tensioned bolt or other fastener. (See FIG. 7)

For each of the above techniques, time resolved measurements can be accomplished, so that real-time monitoring of bolt loads is possible with the present invention.

Thus, the present invention provides a method for measuring the dishing or deformation of a bolt head as a measure of its tension state. In practice, the deformation may not be symmetric in general, but rather off-center and distorted. The off-centeredness can be used as a measure of the bending moment of the bolt/fastener, and it also has another source in the general (i.e. real world) case. The bolt will in general be placed in a hole that has a larger diameter than the bolt. Thus, as the bolt wanders around laterally, the contour map of the depression in the head as a result of bending will wander and distort also. This can create the problem of sorting out the distortions due to lateral displacement of the bolt in its hole from the bending moment distortions.

One solution employs the physics of the situation as a model in the software that interprets the contour map. The contour map of the depression is gathered by for example, digitizing an image of the optical interference pattern (i.e. Newton's Rings, Electronic Speckle Pattern Interferogram, Moire Interferogram, etc.) or fitting an interpolated or otherwise generated (e.g. using a stress finite element model) to a discrete set of data points (individual point deflections at known points on the bolt head.)

The shape of the distortion of the ideal symmetrical contour basically has two different sources, and two different characteristic shapes, since the deflection of the bolt head is a plate deflection for a centrally loaded plate on a circular ring support, and the deflection of the head for the bending case is one where the loading is not just off center to the ring but also non uniform (alternatively, not perpendicular to the plane of the support ring).

A model the generic bolt head or stud bolt end mathematically can be created (i.e. with a finite-element program or by brute force differential equations). Once the model has been created, a parametric study of how the contour map changes with load, centration of the bolt in its hole, and bending moments can be performed. The resulting model can be stored in the bolt gauge, and the measured contour map can be compared with those in the model to see how much of the effect is to be assigned to axial load, bending, and centration. The original contour of the bolt (which is not necessarily flat) is preferably subtracted out from the measured contours so that the actual change in contour due to whatever load is applied is measured.

Some of the characteristics and features of the present invention include, but are not limited to, the following:

1. A system for measuring the preload tension or clamping force in bolts, rivets, and other fasteners; in which the tension is found from the deflection (depression) of the central portion of the fastener head as compared with its unloaded shape.

2. The system of (1) above, in which the depression of the central portion of the fastener head is used to measure real-time, live loads.

3. The system of (1) above, in which the preload or other tension (or compression) is found by the depression (or protrusion) of the member end for structural members such as truss rods, struts, mine ceiling bolts, and other non-clamping members.

4. The system of (1) above, in which the system is calibrated by loading sample bolts, fasteners, or structural members and measuring the central deflections by means of the system.

5. The system of (1) above, in which the system is calibrated by calculating the depressions of the bolts, fasteners or structural members as a consequence of applied loads, based on mechanical properties and geometries of the fasteners or members.

6. The system of 1) above in which calibration is accomplished by any combination of actual loading and calculation.

7. The system of (1) above in which the central depression is measured by means of a single micrometer indicator, whether mechanical, electronic (for example linear variable displacement transducer, inductance proximity sensor, piezoresistive sensor, strain gauge sensor, or capacitance gap sensor), or air gauge.

8. The system of (7) above in which the air gauge is accomplished by 2 or more concentric tubes coaxial with the bolt, wherein the outer tube rests on the fastener surface, and the inner tube is slightly raised above the plane defined by the outer tube end, so that when the fastener is loaded and the gap between the inner tube and the fastener surface increases, there will be an increased gas flow from the inner tube to the outer one (or vice versa) for a given pressure difference between the inner and outer tubes.

9. The system of (1) above in which the central depression of the fastener surface is found by measuring a multiplicity of points over the surface and fitting a smooth two-dimensional surface to the data points, and from which surface both the maximum depression of the surface and its location on the surface of the fastener can be calculated, and from the maximum depression the total axial load can be derived, and from the location the side loads or bending of the fastener can be derived.

10. The system of (1) above, in which optical interferometry for example Newton's Rings accomplished by placing an optical flat against the fastener surface, is used to map the contours of the fastener before and after loading, such contour map being used as a signature of the particular fastener and also used to derive the maximum depression (or protrusion in the case of compressive loading of structural members not fasteners) and location of maximum depression of the fastener, such maximum depression being functionally related to the load and its location measuring side load or bending moments.

11. The system of (1) above, in which moire deflectometry, speckle pattern interferometry, holography, or video deflectometry is used to map the contours of the fastener before and after loading, such contour map being used as a signature of the particular fastener and also used to derive the maximum depression (or protrusion in the case of compressive loading of structural members not fasteners) and location of maximum depression of the fastener, such maximum depression being functionally related to the load and its location measuring side load or bending moments.

12. The system of (1) above, in which an array of capacitive elements is used to map the contours of the fastener before and after loading, such contour map being used as a signature of the particular fastener and also used to derive the maximum depression (or protrusion in the case of compressive loading of structural members not fasteners) and location of maximum depression of the fastener, such maximum depression being functionally related to the load and its location measuring side load or bending moments.

13. The system of (1) above, in which structured light microscopy, in which a projected line is scanned across the surface at an angle from the axis of the bolt, or alternatively a pattern of lines is projected onto the surface at an angle to the surface, and a camera either coaxial to the fastener or at some angle other than the line or grid projector, is used to map the contours of the fastener before and after loading, such contour map being used as a signature of the particular fastener and also used to derive the maximum depression (or protrusion in the case of compressive loading of structural members not fasteners) and location of maximum depression of the fastener, such maximum depression being functionally related to the load and its location measuring side load or bending moments.

14. The system of (1) above, in which refocusing microscopy in which a narrow depth of field microscope is scanned up and down axially above the fastener surface and for each height the section of the surface in focus represents a contour ring, is used to map the contours of the fastener before and after loading, such contour map being used as a signature of the particular fastener and also used to derive the maximum depression (or protrusion in the case of compressive loading of structural members not fasteners) and location of maximum depression of the fastener, such maximum depression being functionally related to the load and its location measuring side load or bending moments.

15. The systems of 1 through 14 above in which time-resolved measurements are obtained so that real-time monitoring of fastener and structural member loading can be accomplished.

16. The systems of 15 above, in which the real-time load values are output from the system to accomplish feedback control of loading equipment for test, stabilization, load compensation, or other purposes.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for comparing the contours of an end surface of a fastener for identifying any different tension states of the fastener, the method comprising the steps of:
    (a) obtaining a first measurement which is a first contour map of an end surface of the fastener;
    (b) obtaining a second measurement which is a second contour map of the surface of the fastener, said second measurement obtained at a period of time after the first measurement is captured; and
    (c) comparing the first contour map with the second contour map for any differences.

2. The method of claim 1 wherein any found differences between the first contour map and the second contour map represent a change in tension in the fastener.

3. The method of claim 1 further comprising the step of recording the obtained first contour map.

4. The method of claim 1 wherein the first contour map is obtained before the fastener is tensioned and the second contour map is obtained after the fastener is tensioned.

5. The method of claim 1 wherein the first contour map is obtained after the fastener is tensioned and the second contour map is also obtained after the fastener is tensioned at a point in time after the first contour map is obtained in order to determine if there is any differences between the first contour map and the second contour map which reflects a change in tension.

6. The method of claim 1 wherein the first contour map is a first set of Newton's Rings and the second contour map is a second set of Newton's Rings.

7. The method of claim 1 wherein the surface of the fastener is a headed end area of the fastener.

8. The method of claim 1 wherein the obtaining of the first contour map and the second contour map is independent of a temperature or length of the fastener.

9. The method of claim 1 wherein the first contour map and the second contour map are obtained by a micrometer indicator.

10. The method of claim 9 wherein the micrometer indicator is selected from mechanical micrometer indicators, electrical micrometer indicators, linear variable displacement transducers, inductance proximity sensors, piezoresistive sensors, strain gauge sensors or capacitance gap sensors.

11. The method of claim 1 wherein the depression of the central portion of the fastener surface is found by measuring a multiplicity of points over the fastener surface and fitting a substantially smooth two-dimensional surface to the data points; wherein the two-dimensional surface permits calculation of a maximum depression for the fastener surface and its location on the fastener surface; wherein the maximum depression permits a total axial load to be derived as well as a location of side loads or bending of the fastener.

12. The method of claim 1 wherein optical interferometry is performed to obtained the first contour map and the second contour map, wherein for obtaining each an optical flat is placed against the fastener surface to map contours of the fastener before and after loading; wherein each obtained contour map is a signature of the fastener and is used to derive a maximum depression or protrusion and a location of the maximum depression of the fastener; wherein the maximum depression is functionally related to a load and a location of a side load or bending moments.

13. The method of claim 12 wherein the optical interferometry is a Newton's Rings procedure.

14. The method of claim 1 wherein moire deflectometry, speckle pattern interferometry, holography, or video deflectometry is performed to map contours of the fastener before and after loading, wherein each contour map is a signature of the fastener and is used to derive a maximum depression or protrusion and a location of maximum depression of the fastener; wherein the maximum depression is functionally related to a load and a location of a side load or bending moments.

15. The method of claim 1 wherein an array of capacitive elements is used to map contours of the fastener before and after loading; wherein each contour map is a signature of the fastener and is used to derive a maximum depression or protrusion and a location of maximum depression of the fastener; wherein the maximum depression is functionally related to a load and a location of a side load or bending moments.

16. The method of claim 1 wherein a structured light microscopy, in which a projected line is scanned across the surface at an angle from an axis of the fastener or a pattern of lines are projected onto the surface at an angle to the surface, and a camera either coaxial to the fastener or at an angle other than a line or grid projector, is used to map contours of the fastener before and after loading; wherein each contour map is a signature of the fastener and is used to derive the maximum depression or protrusion and a location of maximum depression of the fastener; wherein the maximum depression is functionally related to a load and a location of a side load or bending moments.

17. The method of claim 1 wherein refocusing microscopy, in which a narrow depth of a field microscope is scanned up and down axially above the fastener surface and for each height a section of the surface in focus represents a contour ring, is used to map contours of the fastener before and after loading; wherein each contour map is a signature of the fastener and is used to derive a maximum depression or protrusion and a location of maximum depression of the fastener; wherein the maximum depression is functionally related to a load and a location of a side load or bending moments.

18. The method of claim 1 wherein the first contour map and the second contour map are time-resolved for real-time monitoring of the fastener and structural member loading.

19. The method of claim 18 further comprising the step of outputting real-time load values to accomplish feedback control of loading equipment for test, stabilization, load compensation, or other purposes.

20. The method of claim 1 wherein the first contour map is obtained after the fastener is tensioned and the second contour map is also obtained after the fastener is tensioned at a point in time after the first contour map is obtained in order to determine if there is any differences between the first contour map and the second contour map which reflects a change in tension.

21. The method of claim 1 wherein the first contour map is obtained after the fastener is tensioned and the second contour map is also obtained after the fastener is tensioned at a point in time after the first contour map is obtained in order to determine if there is any differences between the first contour map and the second contour map which reflects a change in tension.

22. The method of claim 1 wherein the first contour map and the second contour map are obtained without using a mechanically set center.

23. The method of claim 1 wherein the first measurement consist of a first two dimensional array of numbers to measure centration and bending moments at the end surface of the fastener and the second measurement consist of a second two dimensional array of numbers to measure centration and bending moments at the end surface of the fastener.

24. The method of claim 1 wherein the first measurement consist of a first two dimensional array of numbers to measure centration and bending moments at the end surface of the fastener and the second measurement consist of a second two dimensional array of numbers to measure centration and bending moments at the end surface of the fastener.

25. The method of claim 1 wherein the first measurement consist of a first two dimensional array of numbers to measure centration and bending moments at the end surface of the fastener and the second measurement consist of a second two dimensional array of numbers to measure centration and bending moments at the end surface of the fastener.

26. A method for comparing the contours of an end surface of a fastener for identifying any different tension states of the fastener, the method comprising the steps of:
(a) obtaining a first measurement which is a first contour map of an end surface of the fastener;
(b) obtaining a second measurement which is a second contour map of the end surface of the fastener, said second measurement obtained at a period of time after the first measurement is captured; and
(c) comparing the first contour map with the second contour map for any differences;
wherein any found differences between the first contour map and the second contour map represent a change in tension in the fastener;
wherein the obtaining of the first measurement and the second measurement is independent of a temperature or length of the fastener.

27. The method of claim 26 wherein the end surface of the fastener is a headed end area of the fastener.

28. The method of claim 26 wherein the first contour map and the second contour map are obtained by a micrometer indicator.

29. The method of claim 28 wherein the micrometer indicator is selected from mechanical micrometer indicators, electrical micrometer indicators, linear variable displacement transducers, inductance proximity sensors, piezoresistive sensors, strain gauge sensors or capacitance gap sensors.

30. The method of claim 26 further comprising the step of recording the obtained first contour map.

31. The method of claim 26 wherein the first contour map is obtained before the fastener is tensioned and the second contour map is obtained after the fastener is tensioned.

32. The method of claim 26 wherein the first contour map is a first set of Newton's Rings and the second contour map is a second set of Newton's Rings.

33. The method of claim 26 wherein the first contour map and the second contour map are obtained without using a mechanically set center.

34. A method for comparing the contours of an end surface of a fastener for identifying any different tension states of the fastener, the method comprising the steps of:

(a) obtaining a first measurement which is a first contour map of an end surface of the fastener;

(b) obtaining a second measurement which is a second contour map generated an amount of depression in the central portion of the end surface of the fastener, said second measurement obtained a period of time after the first measurement is captured; and (c) comparing the first contour map with the second contour map for any differences;

wherein any found differences between the first contour map and the second contour map represent a change in tension in the fastener;

wherein the obtaining of the first measurement and the second measurement is independent of a temperature or length of the fastener;

wherein the first measurement and the second measurement are obtained by a micrometer indicator selected from mechanical micrometer indicators, electrical micrometer indicators, linear variable displacement transducers, inductance proximity sensors, piezoresistive sensors, strain gauge sensors or capacitance gap sensors.

35. The method of claim 34 wherein the first contour map is obtained before the fastener is tensioned and the second contour map is obtained after the fastener is tensioned.

36. The method of claim 34 wherein the first contour map and the second contour map are obtained without using a mechanically set center.

* * * * *